United States Patent
Warncke

(10) Patent No.: US 9,371,707 B1
(45) Date of Patent: Jun. 21, 2016

(54) TRANSPORTABLE SEPARATOR FOR SEPARATING PARTICULATE MATTER FROM A MIXTURE CONTAINING OIL, WATER, AND PARTICULATE MATTER

(71) Applicant: Glennwood E. Warncke, Seguin, TX (US)

(72) Inventor: Glennwood E. Warncke, Seguin, TX (US)

( * ) Notice: Subject to any disclaimer, the term of this patent is extended or adjusted under 35 U.S.C. 154(b) by 0 days.

(21) Appl. No.: 15/049,416

(22) Filed: Feb. 22, 2016

Related U.S. Application Data

(60) Provisional application No. 62/153,606, filed on Apr. 28, 2015.

(51) Int. Cl.
| | | |
|---|---|---|
| E21B 21/06 | (2006.01) | |
| B01D 19/00 | (2006.01) | |
| B01D 17/02 | (2006.01) | |
| B01D 21/24 | (2006.01) | |
| B01D 21/30 | (2006.01) | |
| B01D 21/34 | (2006.01) | |
| B01D 5/00 | (2006.01) | |

(52) U.S. Cl.
CPC .............. *E21B 21/06* (2013.01); *B01D 5/0069* (2013.01); *B01D 17/0214* (2013.01); *B01D 19/0042* (2013.01); *B01D 21/2405* (2013.01); *B01D 21/2461* (2013.01); *B01D 21/302* (2013.01); *B01D 21/34* (2013.01)

(58) Field of Classification Search
None
See application file for complete search history.

(56) References Cited

U.S. PATENT DOCUMENTS

| | | | | |
|---|---|---|---|---|
| 5,316,029 | A * | 5/1994 | Campbell | B01D 17/0211 134/104.1 |
| 2004/0020860 | A1* | 2/2004 | Schmigel | B01D 21/245 210/744 |
| 2005/0279715 | A1* | 12/2005 | Strong | B01D 17/0211 210/774 |
| 2007/0075024 | A1* | 4/2007 | Campbell | B01D 21/0003 210/802 |
| 2013/0186622 | A1* | 7/2013 | Thompson | E21B 43/34 166/267 |
| 2013/0284026 | A1* | 10/2013 | Warncke | B01D 19/0057 96/216 |

* cited by examiner

*Primary Examiner* — Duane Smith
*Assistant Examiner* — Phillip Shao
(74) *Attorney, Agent, or Firm* — Buskop Law Group, PC; Wendy Buskop

(57) ABSTRACT

A transportable separator for separating particulate matter from wellbore fluid having a portable separation system and a hydrodynamic jetted gas separator. The portable separation system having a particulate fluid separation chamber fluidly engaging a variable speed screw conveyor for conveying particulate matter forming particle free fluid, a skim chamber removing oil from particle free fluid, a water leg compartment with an adjustable water leg adjusting a level of fluid in the skim chamber, and an oil settling compartment receiving the oil from the skim chamber, and recycling basic sediment and water.

20 Claims, 5 Drawing Sheets

TRANSPORTABLE SEPARATOR FOR
SEPARATING PARTICULATE MATTER
FROM A MIXTURE CONTAINING OIL,
WATER, AND PARTICULATE MATTER

CROSS REFERENCE TO RELATED APPLICATION

The current application claims priority to and the benefit of U.S. Provisional Patent Application Ser. No. 62/153,606 filed on Apr. 28, 2015, entitled "TRANSPORTABLE SEPARATOR FOR SEPARATING PARTICULATE MATTER FROM A MIXTURE CONTAINING OIL, WATER, AND PARTICULATE MATTER". This reference is incorporated in its entirety herein.

FIELD

The present embodiments relate to a transportable separator for separating particulate matter from a mixture containing oil, water, and particulate matter.

BACKGROUND

A need exists for an easy to use versatile separator for not only separating wellbore fluids into oil, waste water, and particulate, but can for handling sweep material.

The present embodiments meet these needs.

BRIEF DESCRIPTION OF THE DRAWINGS

The detailed description will be better understood in conjunction with the accompanying drawings as follows.

Figure 1:
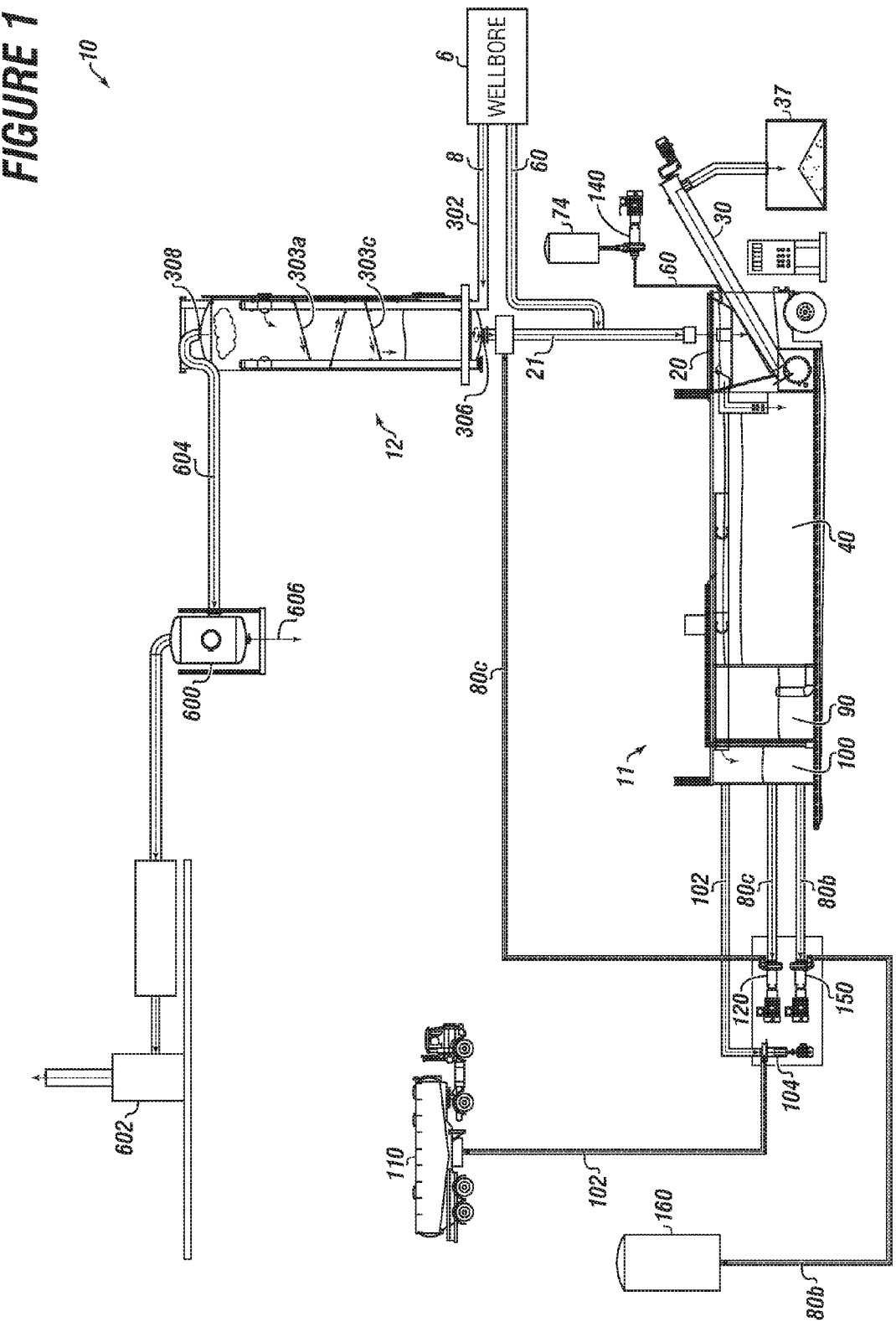
FIG. 1 depicts a diagram of the transportable separator according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a transportable separator for separating particulate matter from a mixture containing oil, water, and particulate matter.

A benefit of the invention is that the transportable separator can be used with a hydrodynamic jetted gas separator to provide gas vapor removal and reduce the likelihood of fires as the wellbore fluid is separated and stored when it flows from a wellbore.

An additional benefit of the invention is that the transportable separator can have the benefit of being easy to operate without the need for complex training thereby keeping the physical stress of an operator to a minimum.

An additional benefit of the invention is that the transportable separator can provide oil containment.

A benefit of the invention is that the transportable separator can help prevent toxic spills by containing separated fluids and particulate.

A benefit of the invention is that the transportable separator can prevent death and illness by reducing exposure to toxic gasses and liquids by providing a closed loop system.

All electrical equipment and housings on the transportable separator can be certified and accepted by National Electric Code as explosion proof devices. The transportable separator can use explosion proof motors.

The transportable separator can have a particulate fluid separation chamber connected to a variable speed screw conveyor for conveying particulate matter.

The transportable separator can have a skim chamber fluidly connected to the particulate fluid separation chamber.

The skim chamber can be used to remove oil from a particle free fluid received from the particulate fluid separation chamber.

The transportable separator can have a water leg compartment with an adjustable water leg for adjusting the level of fluid in the skim chamber.

The transportable separator can have an oil settling compartment for receiving oil from the skim chamber.

The transportable separator can recycle basic sediment and water (BS&W) from the oil settling compartment to the particulate fluid separation chamber of the transportable separator.

In embodiments, an oil pump can be used to remove cleaned oil from the oil settling compartment.

In further embodiments, a skim chamber pump can be used to transfer oil free and particulate free fluid to a waste water tank.

In embodiments, a water leg pump can be used for flowing fluid from the water leg compartment to a containment area.

The transportable separator can have a power source, which can be connected to the system for operating the pumps and conveyors.

In embodiments, the particulate fluid separation chamber can have a fluid guide installed in the interior of the chamber, such as a 36 inch pipe, for receiving a vapor reduced stream from a hydrodynamic jetted gas separator.

In embodiments, the particulate fluid separation chamber can have a perforated plate for allowing vapor reduced fluid and particulate from the fluid guide to flow through holes, such as diamond shaped holes that can be about ¾ of an inch in width and 2 inches in length, while simultaneously stopping larger diameter particulate for removal by the variable speed screw conveyor.

In embodiments, the particulate fluid separation chamber can have a fluid separation box mounted to the side of the particulate separation chamber for conveying particulate free fluid from the particulate fluid separation chamber. In further embodiments, the fluid separation box can be mounted at an angle that is about 45 degrees to the plane of a side wall of the particulate fluid separation chamber.

In embodiments, the transportable separator can receive fluid from a hydrodynamic jetted gas separator that is initially connected to a wellbore and which separates gas from a mixture, which can be received from the wellbore, forming vapor reduced fluid and particulate.

In embodiments, a solids flow meter for measuring mass can be connected to a discharge end of the variable speed screw conveyor.

In embodiments, the solids flow meter can be in electronic communication with a processor and a data storage. The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

In further embodiments, the processor can also be in communication with a display.

In embodiments, the processor can be a computer or a programmable logic circuit.

In embodiments, the processor can be configured to measure the amount of particulate matter flowing from the variable speed screw conveyor.

In embodiments, the processor can also communicate with a fluid level gauge in the skim chamber that can provide fluid level data automatically. In further embodiments, the processor can then automatically control fluid level in the skim chamber.

A power source can be in electronic communication with the processor, the display, the data storage, and any gauges or sensors used. In embodiments, a portable generator can be used.

In embodiments, drilling fluid can be shut off and sweep material flowed into the well. In these embodiments, the particulate fluid separation chamber can have a closable sweep material outlet.

In embodiments, a sweep level control valve can be attached to the closable sweep material outlet to enable the transportable separator to receive wellbore sweep material from the wellbore. Sweep material can be pumped to a sweep material tank while controlling sweep material fluid level in the particulate fluid separation chamber, while concurrently preventing contamination of the skim chamber with sweep material. This embodiment creates a highly versatile transportable separator.

A sweep pump can be connected to the particulate fluid separation chamber and the power source. The sweep pump can be used for flowing sweep material to the sweep material tank.

The skim chamber can have a pair of rotating adjustable skim tubes. In embodiments, the rotating adjustable skim tubes can be mounted transversely across the skim chamber for skimming oil from particulate free fluid in the skim chamber and then flowing the skimmed oil to a trough mounted to the skim chamber.

In embodiments, the transportable separator can have a plurality of lights electrically connected to the power source, with at least one light mounted to the particulate fluid separation chamber, the skim chamber, and the oil settling compartment.

In embodiments, a level control can be used in the oil settling compartment for monitoring received oil from the skim chamber.

In embodiments, the hydrodynamic jetted gas separator can have a vessel, such as a vessel that is 6 feet wide by 23 feet long as example. The vessel can have one or more fluid inlets for receiving wellbore fluid, and one or more fluid outlets, as well as a gas outlet.

In embodiments, the vessel can contain a plurality of baffles. The baffles can be oriented at an angle from 20 degrees to 45 degrees and can be mounted between the fluid inlets and the fluid outlets.

In embodiments, the vessel can comprise a plurality of jets, which can be formed internal or external to the vessel. One of the jets can be a fluid inlet jet, which can be pointed toward a fluid inlet and one of the jets can be a fluid outlet jet, which can provide rotational mixing adjacent the fluid outlet. In further embodiments, two or more of each of these jets can be used.

In embodiments, each jet can have from a 2 inch to 3 inch outer diameter and from a 0.5 of an inch to a 1 inch orifice, enabling variable flow rates through the jets based upon pressure of fluid entering the jets.

The transportable separator and hydrodynamic jetted gas separator can both be skid mounted.

The transportable separator can include a plurality of fans. Each fan can be a constant speed fan or a variable speed fan.

A first fan can be mounted to the particulate fluid separation chamber and a second fan can be mounted to the oil settling compartment.

In embodiments, the fans can be configured to remove hydrogen sulfide fumes and other toxic fumes during separation of the oil, water, and particulate matter.

In embodiments, the transportable separator can have a fire suppression system mounted to the skim chamber, the water leg compartment, the oil settling compartment, and combinations thereof. A supply unit, to provide nitrogen or other fire suppression medium for the fire suppression system can be located remote to a wellbore.

In embodiments, the transportable separator can be connected to a condensate tank in fluid communication with a gas flare system and the hydrodynamic jetted gas separator.

The condensate tank can be configured to collect and drain condensate from the gas vapor exiting the gas outlet of the hydrodynamic jetted gas separator prior to ignition by the gas flare system.

The term "adjustable water leg" as used herein can refer to various lengths of tube, such as a 12 inch "L" shaped tube formed of 12" pipe and fittings and affixed at a lower end using a slip joint. A manual winch can be used to raise or lower the free end of the water leg and thus adjust height of water maintained in the adjacent skim chamber.

The term "baffle" as used herein can refer to a device, such as a plate, that is used to direct water flow in the vessel of the hydrodynamic jetted gas separator. Surface and slope of ellipsoid plates promote breakup of entrained solids from wellhead discharged as well as shedding and slowing of cascading fluid portion of wellhead discharge to both promote separation of gasses from suspension and delivery of fluids with suspended solid particulate matter to the bottom of a vertically positioned vessel for delivery to the particulate fluid separation chamber.

The term "conduit" as used herein can refer to a passageway that can be a rigid, durable, impact resistant material. The conduit can be a trough, a spillway, a dam, or a pipe. The pipe can have an inner diameter ranging from 8 inches to 12 inches.

The term "fan" as used herein can refer to four bladed fans powered by 3 horsepower, 480 volt explosion proof electric motors operating at 1145 revolutions per minute (RPM) to provide dual function of providing an air stream to disperse gasses that may emanate from fluids contained in any portable separation system compartment.

The term "fire suppression system" as used herein can refer to a 100-gallon mixture of 3 percent to 6 percent of a fire extinguishing chemical and/or water in a container, that when activated using an inert gas source, such as a nitrogen gas, the fire suppression system flows the mixture under pressure to a fire nozzle. In embodiments the fire suppression system can use 1,200 PSI nitrogen to provide a fire suppressing and air excluding layer of foam onto the surface of liquids contained in each of the portable separation compartments.

The term "fluid guide" as used herein can refer to an open cylinder, such as a 24 inch to 48 inch diameter container with a height ranging from 18 inches to 24 inches. The fluid guide can be used to reduce splash out and promote directed fluid flow into the particulate fluid separation chamber.

The term "fluid level gauge" as used herein can refer to an electronic depth meter, such as a KROHNE OPTIWAVE™ 7300C or an equivalent meter used to determine a water level in the water leg compartment.

The term "fluid separating box" as used herein can refer to a 3' by 3' open top box formed of steel plate with a slanted steel plate dividing the box into two compartments, a top box and a solid bottom compartment. In embodiments, the inner dividing steel plate can be 3 inches less in height than the box side walls. Water can flow over this slanted steel plate into solid bottom compartment.

The term "gas flare system" as used herein can refer to a system with a flare ignition system, a flare stack, and a flare line. The flare stack can be constructed of steel pipe and can be supplied in pipe sizes from 6 inches to 12 inches with 8 inches being a standard size provided for most applications. The gas flare system can be mounted vertically with an open end to which an igniter can be attached and placed topmost on the stack. The vertically positioned flare stack can be stayed with three guy wires, which can be positioned at 120 degrees from one another around a circumference of the stacks at attachment points and connected at ground level to either driven rods or weighted boxes to position the guy wires at about a 45 degree angle off a horizontal to stay the stack in position. The height of the flare stack can be 40'. The flare stack height enables a sustained flame at an elevation sufficient to minimize potential for ignition of heavier than air gasses that might be present along the ground. The flare stack height also elevates the flamed gasses for better dispersion and dilution. In embodiment, 6 inch to 12 inch steel flanged pipe can be connected between the flare stack and the hydrodynamic jetted gas separator in whatever linear feet of line proscribed to remotely locate the sustained flame from other equipment on site and minimize potential unwanted flame ignition of material other than the intended potentially harmful gasses.

The term "hydrodynamic jetted gas separator" as used herein can refer to vessels such as the STRATEGI HYDRODYNAMIC SEPARATOR™, which can be a vessel configured to have a 6' diameter by 23' length in the shape of a cylinder with convex end caps constructed of ⅜" 16,600 psi stress value steel plate with 85 percent strength welded seams. The hydrodynamic jetted gas separator is designed for a maximum working pressure of 147 psi, a hydrostatic test pressure of 220 psi with design capacity of 65 mmscf/d gas and 38,000 bpd fluid at delivered pressure of 125 psi at atmospheric operation and 83 mmscf/d gas and 59,000 bpd fluid as a pressurized system. In embodiments, the vessel of the hydrodynamic jetted gas separator will have minimum of 3 or maximum of 5 ellipsoid baffles within vessel confines. The baffles are pitched at approximately 20 degrees negative pitch towards a central longitudinal axis of the vessel. The vessel can be designed to have a bottom convex end cap with a water injector strategically positioned off all longitudinal axes of the vessel cylinder and end cap. A second water injector can be placed in the discharge manifold of the vessel in line and discharging downstream along with vessel liquid discharge. A third water injector can be installed in the discharge manifold pointing its discharge up into the vessel. In operation, the ellipsoid baffle plates shed water and suspend solid particulates to flow downward by gravity as well as to reduce forward velocity to promote separation of gasses from the liquid portion from the well head. Jets are placed off all axes of both cylinder and convex end cap inducing a rapid swirl and turbulence to the liquid and particulate mixture to facilitate maintaining solids in suspension until dispelled from vessel through the vessel discharge manifold where a jet functions as a hydrodynamic pump to thrust the liquid and suspended solids discharge out of the vessel and up and over to the particulate fluid separation chamber.

The term "lights" as used herein can refer to light emitting diodes "LED", which can have 120 volt light bars in explosion proof housings used to provide illumination in poor ambient light situations of all or portions of the portable separation system.

The term "oil level control" can refer to a side mounted explosion proof float switch by Murphy Manufacturing that can be mounted within an oil settling compartment in order to control the oil pump of the portable separation system.

The term "oil pump" as used herein can refer to an oil pump, such as a MISSION PRODUCTS™ 3 inch by 2 inch pump coupled to a 30 horsepower, 3 phase, 480 volt A/C explosion proof motor operating at 1775 revolutions per minute (RPM), such as one made by Baldor, wherein the oil pump serves to pump clarified oil from the oil settling compartment to off unit storage.

The term "oil settling compartment" as used herein can refer to a compartment such as a 2 foot to 8 foot long by 8 foot wide by 8 foot deep open topped compartment formed with corrugated steel walls and a flat sheet plate steel bottom. The oil settling compartment can collect and further clarify skimmed oil as denser materials settle out of suspension to a bottom of the compartment.

The term "oil settling compartment submersible pump" as used herein can refer to a ½ horsepower explosion proof submersible pump with a 1" outlet situated at a bottom of the oil settling compartment.

The term "flightings" as used herein can refer to a portion of the variable speed screw conveyor. In embodiments, each flighting can be formed of ⅜" steel sheet metal cut and welded around an 8"-12" pipe core.

The term "particulate fluid separation chamber" as used herein can refer to a chamber, which can be in the shape of an open topped inverted 8' square based pyramid, with the apex of converging solid ⅜" steel sides open to an orifice for the variable speed screw conveyor.

The term "perforated plate" as used herein can refer to a flow dispersal device formed of extruded steel with hexagonal openings 1" by 3" at a density of every 1 inch to 2 inches.

The term "plurality of jets" as used herein can refer to water injectors such as 4" to 1" water injectors. The function of each jet depends on the amount and size of a sand load in the vessel that can compact in the vessel. One jet can be pointed upward into the body of the vessel enabling high pressure water to jet into a compacted vessel increasing likelihood of breaking up compacting which can be further broken up by the action of water injector.

The term "portable separation system" as used herein can refer to a trailer with at least one axle with at least two wheels. In embodiments, the trailer can have a fifth wheel with king pin connecting to a tractor of a tractor-trailer. In embodiments, the portable separation system can be skid mounted or barge mounted.

The term "power source" as used herein can refer to a 150 kilovolt to 180 kilovolt 3 phase/single phase, 480/120 volt electric generator powered by a diesel engine, a steam turbine or a gas engine.

The term "processor" as used herein can refer to a computer that acts as an interface, such as between a solids flow meter and a visual display.

The term "rotating adjustable skim tubes" as used herein can refer to a pair of 6" to 10" pipes, each pipe with a 6" notch cut longitudinally along a sides of the pipe. The rotating adjustable skim tubes can each have an axis mounted stud affixed to serve as a pivot axis for each tube along with a similar pivot axis welded on a trough. Each tube can have three radial positioned 1" rods receiving segments to each accommodate a 1" rod used to position tube chord cut at any desired configuration along the long axis to accommodate skim depth from 0" to 6".

The term "skim chamber" as used herein can refer to a chamber that can be 10'-20' long by 6'-8' wide by 6'-8' deep and formed as an open top chamber formed with corrugated steel walls and flat sheet plate bottom. In embodiments, all seams of the skim chamber are welded.

The term "skim chamber pump" in embodiments can be any pump know in the industry, such as a DRAGON™ pump, model 250, 4×3 coupled to a 25 horsepower-50 horsepower, 3 phase, 480 volt A/C explosion proof electric motor operating at 1775 RPM, such as those made by Baldor.

The term "slots" as used herein can refer to openings formed in the variable speed screw conveyor that can be 3" along an outer rim of the flighting. The slots can provide drainage of liquids entrained with sand back down the variable screw conveyor into the particulate/fluid separation chamber. In embodiments, the slots can be perforations, slits or cuts.

The term "variable speed screw conveyor" as used herein can refer to an 18" by 21' auger that has a 16-¾" by 8" pitch right hand sectional screw mounted on 8" schedule 40 pipe. In embodiments, a maximum speed of the auger conveyor is limited to 30 rpm by a geared speed reduction box to which is mounted a 15 HP, 3 phase, 480 volt A/C explosion proof motor whose maximum speed may be reduced by variable frequency drive control.

The term "water leg compartment" as used herein can refer to a 6 foot long by 8 foot wide by 8 foot deep open topped chamber formed with corrugated steel walls and flat sheet plate bottom. In embodiments, the water leg compartment can have all seams welded.

The term "water leg pump" as used herein can refer to any pump known in the industry, such as a DRAGON™ 3" Dxp Skid Pump coupled to a 15 horse power, 3 phase, 480 volt A/C explosion proof electric motor operating at 1770 revolutions per minute, such as those made by Baldor.

Turning now to the Figures, FIG. 1 depicts a diagram of the transportable separator 10 connected a portable separation system 11 and to a hydrodynamic jetted gas separator 12 according to one or more embodiments.

In embodiments, the hydrodynamic jetted gas separator 12 can receive a mixture 8 from a wellbore 6.

The transportable separator 10 can separate particulate matter from the mixture 8 from the wellbore 6, wherein the mixture 8 can contain oil, water and particulate matter.

The hydrodynamic jetted gas separator 12 can transfer a vapor reduced fluid and particulate 21 separated from the mixture 8 to the portable separation system 11.

The portable separation system 11 can also receive sweep material 60 from the wellbore 6.

The portable separation system 11 can have a particulate fluid separation chamber 20 receiving the vapor reduced fluid and particulate 21 forming flowing particulate free fluid and the mixture 8 from a wellbore 6. The particulate can have a diameter ranging from 5 microns to ¾ inch.

The particulate fluid separation chamber 20 can be configured for separating particulate free fluid from particulate matter.

A variable speed screw conveyor 30 can convey particulate matter from the particulate fluid separation chamber 20 to a container 37 from the particulate fluid separation chamber and simultaneously allow a mixture of water and oil as it separates from the particulate matter to flow back into the particulate fluid separation chamber 20.

A skim chamber 40 can receive particulate free fluid and remove oil to form oil free and particulate free fluid.

A water leg compartment 90 can receive oil free and particulate free fluid from the skim chamber.

An oil settling compartment 100 can receive oil from the skim chamber.

The oil settling compartment can have an oil settling compartment submersible pump to recycle basic sediment and water (BS&W) from the oil settling compartment to the skim chamber 40.

An oil pump 104 can transfer cleaned oil 102 to an oil containment device 110. The oil containment device 110 can be an oil storage tank or truck.

A water leg pump 150 can connect to the water leg compartment 90 and can pump a portion of the oil free and particulate free fluid 80b to a containment area 160.

Sweep material 60 can be pumped from the particulate fluid separation chamber 20 to a sweep material tank 74.

A sweep pump 140 can connect to the particulate fluid separation chamber 20 and a power source to flow the sweep material 60 to the sweep material tank 74.

The oil settling compartment 100 can form an oil free and particulate free fluid 80c.

A skim chamber pump 120 can pull oil free and particulate free fluid 80c from the skim chamber 40 and flow the oil free and particulate free fluid 80c to a plurality of jets installed in the vessel of the hydrodynamic jetted gas separator 12.

The hydrodynamic jetted gas separator 12 can separate gas from not only the oil free and particulate free fluid 80c but also from the mixture 8 as introduced from the wellbore by a fluid, gas and particulate inlet 302 for receiving the mixture 8.

The mixture 8 can contain vapor, oil, water and particulate matter.

The hydrodynamic jetted gas separator 12 can remove gas vapor 604 forming a vapor reduced fluid and particulate 21.

The hydrodynamic jetted gas separator 12 can have a fluid outlet 306 and a gas outlet 308.

The hydrodynamic jetted gas separator 12 can have a plurality of baffles 303a-303c, which can be mounted between the fluid, gas and particulate inlet 302 and the fluid outlet 306.

A plurality of jets can be mounted proximate the fluid outlet 308.

A condensate tank 600 can be inline between a gas flare system 602 and the hydrodynamic jetted gas separator 12.

The condensate tank 600 can be configured to collect and drain condensate 606 from gas vapor 604 flowing from the gas outlet 308 of the hydrodynamic jetted gas separator 12 prior to ignition by the gas flare system 602.

Figure 2:
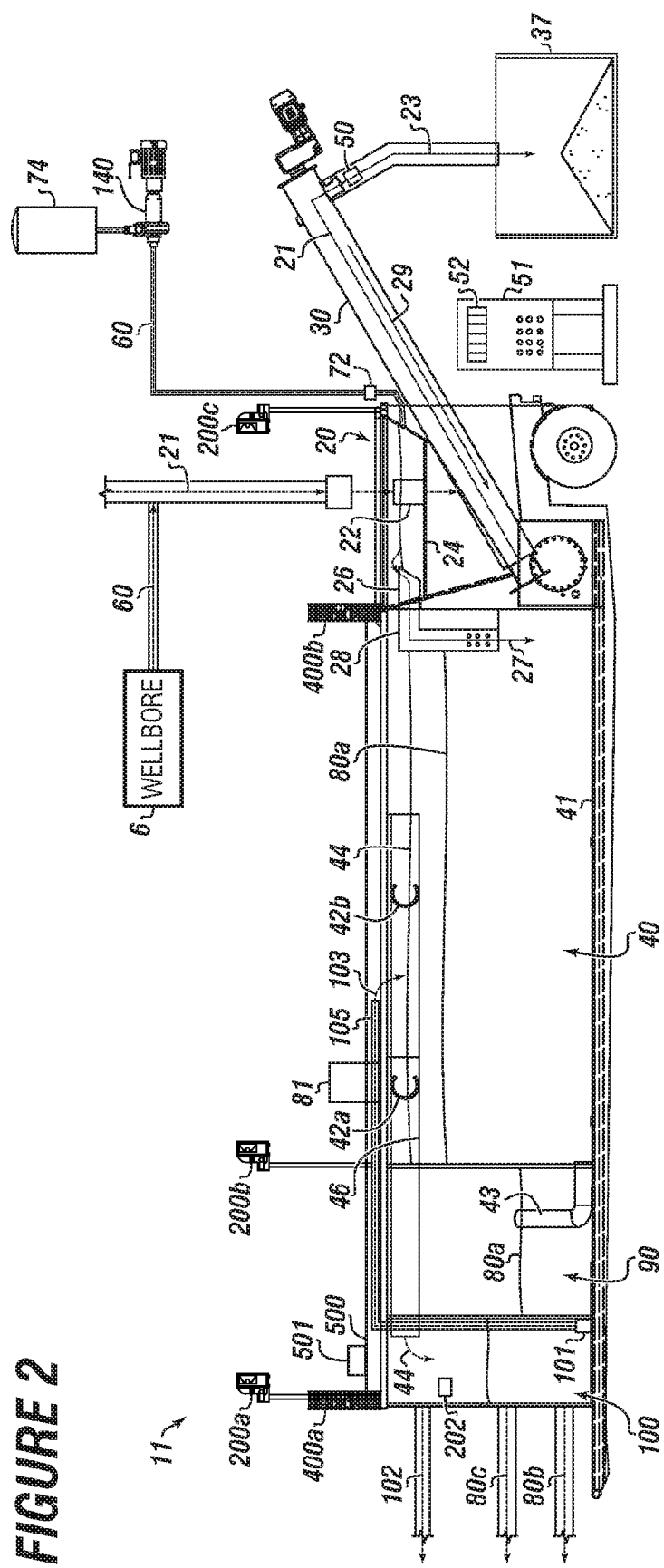
FIG. 2 depicts a detail of the portable separation system according to one or more embodiments.

FIG. 2 shows a detail of the portable separation system 11 connected to the wellbore 6 according to one or more embodiments.

The wellbore 6 can produce the sweep material 60 that mixes with the vapor reduced fluid and particulate 21 from the hydrodynamic jetted gas separator.

The particulate fluid separation chamber 20 can receive both the sweep material 60 and the vapor reduced fluid and particulate 21 and form particulate free fluid 27.

A fluid guide 22 can be located in the particulate fluid separation chamber 20 for controlling flow of the vapor reduced fluid and particulate 21 towards the variable speed screw conveyor 30.

A perforated plate 24 can be located in the particulate fluid separation chamber 20 for receiving the vapor reduced fluid and particulate 21 from the fluid guide 22 prior to conveying fluid and particulate toward the variable speed screw conveyor 30.

The variable speed screw conveyor can allow a mixture of water and oil 29 to flow back down the variable speed screw conveyor 30 to the particulate fluid separation chamber 20 while vapor reduced fluid and particulate 21 flows up the flighting of the variable speed screw conveyor.

The particulate fluid separation chamber 20 can support one end of the variable speed screw conveyor 30 for conveying particulate matter 23 from the particulate fluid separation chamber 20 while simultaneously allowing a mixture of water and oil 29 from the particulate matter to flow back into the particulate fluid separation chamber 20 while transporting the particulate matter 23 to the container 37.

A solids flow meter 50 can be connected to a discharge end of the variable speed screw conveyor 30.

The solids flow meter 50 can be in electronic communication with a processor 51 with a display 52. The processor 51 can have a data storage or memory area and can contain computer instructions configured to instruct the processor to measure an amount of particulate matter flowing from the variable speed screw conveyor.

The processor can further be electrically connected to a power source, such as a generator.

A fluid separation box 26 can be mounted to the side of the particulate separation chamber 20 for conveying particulate free fluid 27 from the particulate fluid separation chamber 20.

In an embodiment, the fluid separator box 26 can communicate fluidly with a conduit 28.

The skim chamber 40 can receive particulate free fluid 27 from the conduit 28. In embodiments, the conduit 28 can open at or very close to a bottom 41 of the skim chamber 40.

In an embodiment, the conduit 28 can open within 8 inches to 24 inches of the bottom 41.

In the skim chamber 40, oil 44 can be removed from the particulate free fluid 27 forming oil free and particulate free fluid 80a.

A pair of rotating adjustable skim tubes 42a and 42b can be mounted transversely across the skim chamber 40. The pair or rotating adjustable skim tubes can skim oil, separate the particulate free fluid 27 in the skim chamber 40, and flow the skimmed oil 44 to a trough 46, which can be mounted to the skim chamber 40.

The water leg compartment 90 can receive oil free and particulate free fluid 80a.

The water leg compartment 90 can contain an adjustable water leg 43 for adjusting level of the particulate free fluid 27 in the skim chamber 40.

The adjustable water leg 43 can be moved by a winch, such as a manual winch.

The oil settling compartment 100 can receive oil 44 removed from the particulate free fluid 27 in the skim chamber 40.

An oil settling compartment submersible pump 101 can be mounted in the oil settling compartment 100.

The oil settling compartment submersible pump 101 can recycle basic sediment and water (BS&W) 103 using a basic sediment and water (BS&W) conduit 105 from the oil settling compartment 100 to the skim chamber 40.

The oil settling compartment submersible pump 101 transfers cleaned oil 102 to flow to the oil containment device.

A water leg pump, not shown, can be connected to the water leg compartment 90 for pumping a portion of the oil free and particulate free fluid 80b to a containment area.

An oil level control 202 in the oil settling compartment 100 can be used for monitoring and controlling an amount of received oil 44 from the skim chamber.

In embodiments, the oil level control 202 can be in electronic communication with the processor 51 enabling the devices to be monitored automatically and remotely.

The skim chamber 40 is shown forming oil free and particulate free fluid 80c.

In embodiments, a plurality of lights 200a, 200b and 200c can be used on the portable separation system 11. In embodiments, the lights can be electrically connected to an onboard power source.

A first light 200a can be mounted to the oil settling compartment 100, a second light 200b can be mounted to the skim chamber 40 and a third light 200c can be mounted to the particulate fluid separation chamber 20.

In embodiments, a plurality of fans 400a and 400b can be used. A first fan 400a can be mounted to the oil settling compartment 100 and a second fan 400b can be mounted to particulate fluid separation chamber 20.

The fans can be configured to remove hydrogen sulfide fumes and other toxic fumes during separation of the oil, water, and particulate matter.

A fire suppression system 500 with a nitrogen unit 501 can mounted on the portable separation system 11. In embodiments, the nitrogen unit 501 can be located remote to the wellbore 6.

A sweep level control valve 72 can be mounted in fluid connection with the particulate fluid separation chamber 20.

The sweep level control valve 72 can enable the portable separation system 11 to receive sweep material 60 from the wellbore 6 and pump sweep material 60 to the sweep material tank 74 while controlling sweep material fluid level in the particulate fluid separation chamber 20 and preventing contamination of the skim chamber 40 with sweep material 60.

The sweep pump 140 is shown connected to the particulate fluid separation chamber 20. The sweep pump can flow sweep material 60 to the sweep material tank 74.

An electronic fluid level gauge 81 can be mounted to the skim chamber 40 for measuring and controlling a level of particulate free fluid 27 in the skim chamber and flowing the oil free and particulate free fluid 80c from the skim chamber.

Figures 3A, 3B:
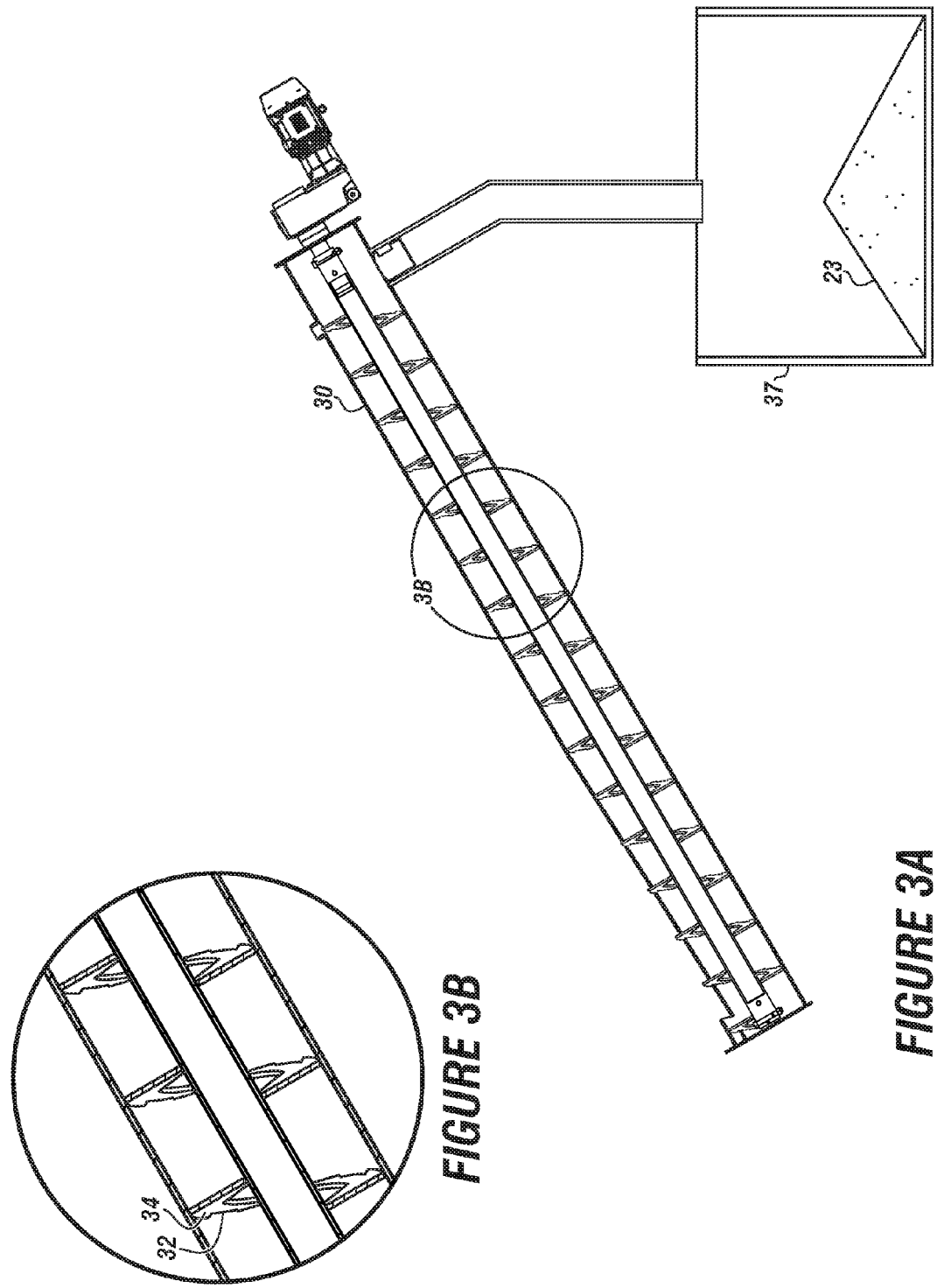
FIG. 3A depicts a detailed side view of the variable speed screw conveyor according to one or more embodiments.
FIG. 3B depicts a detailed view of the flighting and slots of the variable speed conveyor according to one or more embodiments.

FIG. 3A depicts a side view of the variable speed screw conveyor 30 flowing particulate matter 23 to the container 37 according to one or more embodiments.

FIG. 3B depicts a detail of the variable speed screw conveyor with slots 32 formed in a continuous flighting 34 according to one or more embodiments.

The slots 32 can enable draining of oil and water from particulate, such as sand that is conveyed by the variable speed screw conveyor.

In embodiments, the variable speed screw conveyor can be an auger.

Figure 4:
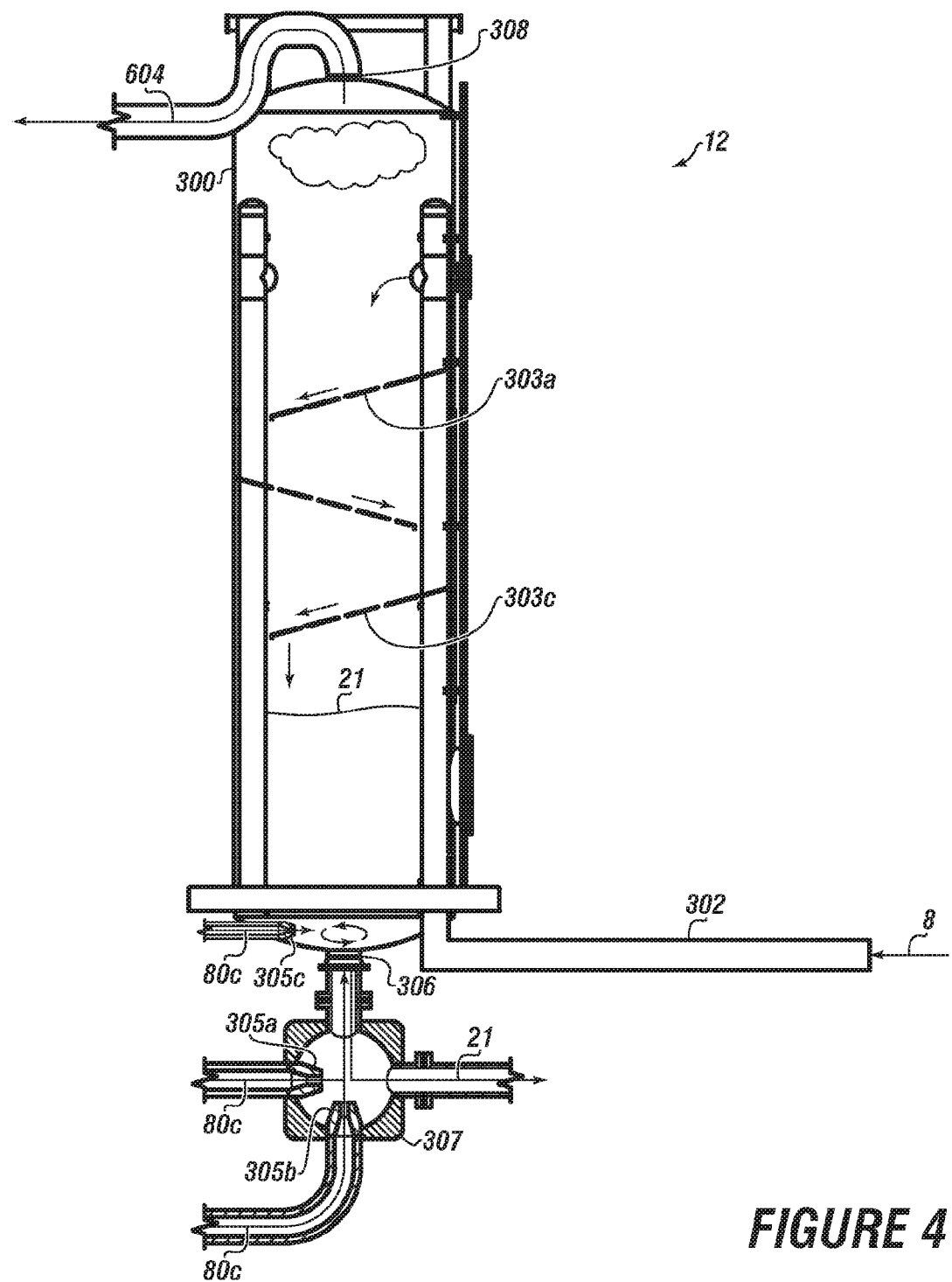
FIG. 4 depicts a detail of the hydrodynamic jetted gas separator according to one or more embodiments.

FIG. 4 depicts a detail of the hydrodynamic jetted gas separator 12 according to one or more embodiments.

The hydrodynamic jetted gas separator 12 receives the mixture 8 through a particulate inlet 302. The mixture 8 can contain oil, water and particulate matter.

In this embodiment, the hydrodynamic jetted gas separator 12 can be a vessel 300 with a fluid outlet 306 and the gas outlet 308.

The plurality of baffles 303a-303c are shown contained at an angle within the vessel forming the hydrodynamic jetted gas separator and mounted between the fluid inlet and the fluid outlet.

The hydrodynamic jetted gas separator 12 can have a discharge manifold 307 supporting a plurality of jets 305a-305c for turbid mixing of vapor reduced fluid and particulate 21.

In this embodiment, the plurality of jets 305a and 305b can be pointed toward the fluid outlet 306 with a portion of the oil free and particulate free fluid 80c.

Jet 305c can provide rotational mixing adjacent the fluid outlet with oil free and particulate free fluid 80c.

Each of the plurality of jets 305a-305c can have a 2 inch to 3 inch outer diameter and a 0.5 of an inch to 1 inch orifice, enabling variable flow rates through the jets based upon the pressure of fluid entering the jets.

Gas vapor 604 can be conveyed from the gas outlet 308 of the hydrodynamic jetted gas separator 12. Gas vapor pressures and flow rates can vary based upon the output from the wellbore.

Figure 5:
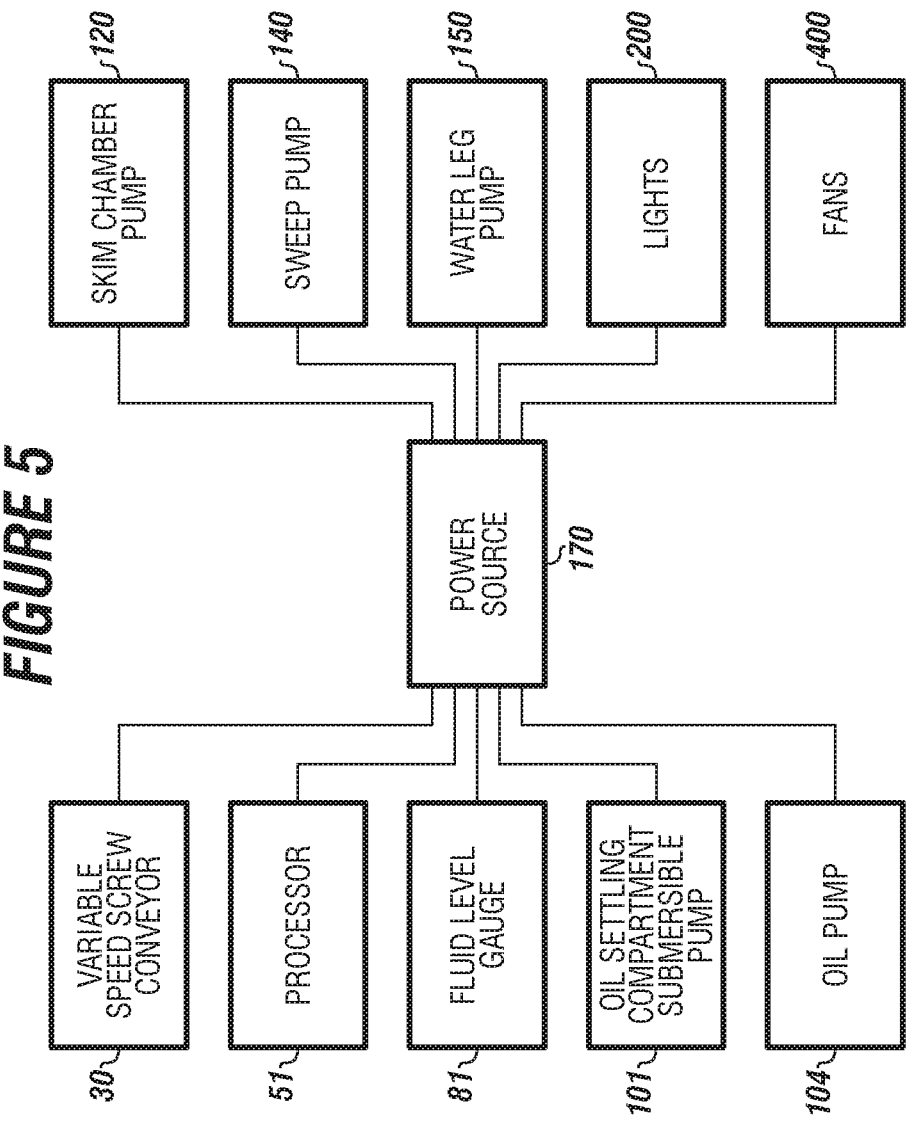
FIG. 5 depicts a diagram of the connections to a power source according to one or more embodiments.

FIG. 5 depicts a diagram of the connections to a power source according to one or more embodiments.

The power source 170, which can be an onboard generator, can provide power to the variable speed screw conveyor 30, the processor 51, the fluid level gauge 81, and the oil settling compartment submersible pump 101.

The power source 170 can also provide power to the oil pump 104, the skim chamber pump 120, the sweep pump 140, the water leg pump 150, the plurality of lights 200, and the plurality of fans 400.

In an embodiment and in reference to the Figures, the transportable separator 10 for separating particulate matter from a mixture, wherein the transportable separator can include a portable separation system 11 with a particulate fluid separation chamber 20 for receiving vapor reduced fluid and particulate 21 having particulate with a diameter ranging from 5 microns to ¾ inch and a mixture 8 from a wellbore 6. The particulate fluid separation chamber 20 can be configured for separating particulate free fluid 27 from particulate matter.

The portable separation system 11 can have a variable speed screw conveyor 30 for conveying particulate matter 23 to a container from the particulate fluid separation chamber and simultaneously allowing a mixture of water and oil 29 to flow back into the particulate fluid separation chamber.

The portable separation system 11 can have a skim chamber 40 with a skim chamber pump 120. The skim chamber 40 can be configured for receiving the particulate free fluid 27, removing oil 44 from the particulate free fluid 27 and forming oil free and particulate free fluid 80c. The skim chamber can comprise a fluid level gauge 81 in the skim chamber for controlling a level of the particulate free fluid in the skim chamber 40 and flowing the oil free and particulate free fluid 80c from the skim chamber.

The portable separation system 11 can have a water leg compartment 90 for receiving the oil free and particulate free fluid 80c. The water leg compartment can comprise an adjustable water leg 43.

The portable separation system 11 can have an oil settling compartment 100 for receiving the oil 44 from the skim chamber 40 and forming cleaned oil 102. Also, the oil settling compartment can have an oil settling compartment submersible pump 101 to recycle basic sediment and water 103 using a basic sediment and water conduit 105 from the oil settling compartment 100 to the skim chamber 40.

The portable separation system 11 can have an oil pump 104 for transferring the cleaned oil 102 to an oil containment device. The oil containment device 110 and a water leg pump 150 can be connected to the water leg compartment 90 for pumping a portion of the oil free and particulate free fluid 80b to a containment area 160.

The power source 170 can be in communication with the water leg pump 150, the oil pump 104, the skim chamber pump 120, the variable speed screw conveyor 30, the oil settling compartment submersible pump 101, and the fluid level gauge 81.

In an embodiment, the transportable separator 10 can include a hydrodynamic jetted gas separator 12 fluidly receiving a mixture from a wellbore and flowing vapor reduced fluid and particulate 21 to particulate fluid separation chamber 20. The hydrodynamic jetted gas separator can be configured for separating gas vapor 604 from the mixture 8 and from oil free and particulate free fluid 80c from the portable separation system 11. The hydrodynamic jetted gas separator can comprise a plurality of jets 305a-305c for turbid mixing of the vapor reduced fluid and particulate 21.

To understand how to operate the system, reference to the Figures is made.

To start the system, the power source 170 is turned on.

Then, the transportable separator 10 can be charged by flowing water using pumps in the various chambers of the transportable separator including the particulate fluid separation chamber 20, the skim chamber 40 and the water leg compartment 90. Water can be continuously circulated to prime the transportable separator using pumps.

Once the transportable separator is primed, the variable speed screw conveyor 30 with slots 32 formed in flighting 34 can be turned on.

Once a predetermined fluid level in each of the particulate fluid separation chamber 20, skim chamber 40, and water leg compartment 90 is reached, additional pumps can be turned on.

The wellbore can flow fluid to the transportable separator 10 for separating particulate matter from a mixture containing oil, water and particulate matter, specifically the wellbore fluid can flow first into the particulate fluid separation chamber 20.

Fluid can flow from the particulate fluid separation chamber 20 into a skim chamber 40 and from the skim chamber 40 to the water leg compartment 90.

The oil settling compartment 100 on the transportable separator 10 can receive oil 44 from the skim chamber if oil is present in the fluid.

The oil settling compartment submersible pump 101 can recycle basic sediment and water (BS&W) from the received oil 44 to the skim chamber 40, thereby enabling cleaned oil 102 to flow to the oil storage tank or truck 110.

If the hydrodynamic jetted gas separator 12 can be used with the transportable separator. The hydrodynamic jetted gas separator can be primed with fluid, and filled to capacity.

The hydrodynamic jetted gas separator can separate gas from the mixture containing oil, water and particulate matter, and form gas vapor 604 and the vapor reduced fluid and particulate 21.

The skim chamber pump 120 can be turned on to operate the plurality of jets of the hydrodynamic jetted gas separator 12.

Once the plurality of jets are operating, then the mixture 8 can be received into the hydrodynamic jetted gas separator from the wellbore and processed.

Levels in each of the three compartments of the transportable separator including the particulate fluid separation chamber 20, the skim chamber 40, and the water leg compartment 90 can be controlled by turning pumps on and off.

Once transportable separator processes sweep material, the wellbore fluids can be diverted from the hydrodynamic jetted gas separator directly into the particulate fluid separation chamber 20.

Once the level of sweep material in the particulate fluid separation chamber 20 reaches the sweep level control valve 72, the sweep pump 140 can be turned on.

The sweep pump 140 can pump the sweep material 60 to the sweep material tank 74 while controlling sweep material fluid level in the particulate fluid separation chamber 20 and preventing contamination of the skim chamber 40 with sweep material 60.

The processor 51 can be used to measure and provide a graphical or tabular display to an operator of the particulate rates coming from the variable speed screw conveyor.

While these embodiments have been described with emphasis on the embodiments, it should be understood that within the scope of the appended claims, the embodiments might be practiced other than as specifically described herein.

What is claimed is:

1. A transportable separator for separating particulate matter from a mixture, the transportable separator comprises:
   a. a portable separation system comprising:
      (i) a particulate fluid separation chamber for receiving vapor reduced fluid and particulate having particulate with a diameter ranging from 5 microns to ¾ of an inch and a mixture from a wellbore, wherein the particulate fluid separation chamber is configured for separating particulate free fluid from the particulate matter;
      (ii) a variable speed screw conveyor for conveying the particulate matter to a container from the particulate fluid separation chamber and simultaneously allowing a mixture of water and oil to flow back into the particulate fluid separation chamber;
      (iii) a skim chamber with a skim chamber pump, the skim chamber configured for receiving the particulate free fluid, removing oil from the particulate free fluid, forming an oil free and particulate free fluid, and flowing the oil free and particulate free fluid from the skim chamber, wherein the skim chamber comprises a fluid level gauge in the skim chamber for controlling a level of the particulate free fluid in the skim chamber;
      (iv) a water leg compartment for receiving the oil free and particulate free fluid, wherein the water leg compartment comprises an adjustable water leg;
      (v) an oil settling compartment for receiving the oil from the skim chamber and forming cleaned oil, the oil settling compartment further comprising an oil settling compartment submersible pump to recycle basic sediment and water using a basic sediment and water conduit from the oil settling compartment to the skim chamber;
      (vi) an oil pump for transferring the cleaned oil to an oil containment device;
      (vii) a water leg pump connected to the water leg compartment for pumping a portion of the oil free and particulate free fluid to a containment area; and
      (viii) a power source in communication with the water leg pump, the oil pump, the skim chamber pump, the variable speed screw conveyor, the oil settling compartment submersible pump, and the fluid level gauge; and
   b. a hydrodynamic jetted gas separator for fluidly receiving the mixture from the wellbore and flowing the vapor reduced fluid and particulate to the particulate fluid separation chamber, wherein the hydrodynamic jetted gas separator is configured for separating gas vapor from the mixture and from the oil free and particulate free fluid from the portable separation system, the hydrodynamic jetted gas separator comprising a discharge manifold supporting a plurality of jets for turbid mixing of the vapor reduced fluid and the particulate.

2. The transportable separator of claim 1, wherein the particulate fluid separation chamber comprising:
   a. a fluid guide for receiving the vapor reduced fluid and particulate from the hydrodynamic jetted gas separator;
   b. a perforated plate for receiving the vapor reduced fluid and particulate from the fluid guide and flowing the particulate to the variable speed screw conveyor; and
   c. a fluid separation box mounted to the particulate fluid separation chamber for converting the vapor reduced fluid and particulate to the particulate free fluid.

3. The transportable separator of claim 1, further comprising a solids flow meter connected to the variable speed screw conveyor, wherein the solids flow meter is in electronic communication with a processor with a display, further wherein the processor and the display are mounted apart from the portable separation system and the processor is configured to measure an amount of the particulate matter flowing from the variable speed screw conveyor and is electrically connected to the power source.

4. The transportable separator of claim 1, further comprising a pair of rotating adjustable skim tubes mounted transversely across the skim chamber for skimming oil from the particulate free fluid in the skim chamber and flowing the oil to a trough mounted to the skim chamber.

5. The transportable separator of claim 1, comprising a plurality of lights mounted to the portable separation system, wherein the plurality of lights are electrically connected to the power source.

6. The transportable separator of claim 1, comprising an oil level control in the oil settling compartment for monitoring and controlling the oil entering from the skim chamber.

7. The transportable separator of claim 1, wherein the hydrodynamic jetted gas separator comprises:
   a. a fluid, gas and particulate inlet;
   b. a fluid outlet;
   c. a gas outlet; and
   d. a plurality of baffles mounted between the fluid, gas and particulate inlet and the gas outlet; and
      wherein at least one of the plurality of jets is pointed toward the fluid, gas and particulate inlet in a vessel and at least one of the plurality of jets provides rotational mixing adjacent the fluid outlet.

8. The transportable separator of claim 1, wherein the hydrodynamic jetted gas separator is skid mounted and oriented 90 degrees from a surface supporting the portable separation system.

9. The transportable separator of claim 7, wherein each of the plurality of jets has a 2 inch to 3 inch outer diameter and a 0.5 inch to 1 inch orifice with the plurality of jets configured to enable a variable flow rate of the vapor reduced fluid and the particulate through the plurality of jets.

10. The transportable separator of claim 1, further comprising a plurality of fans mounted to the portable separation system with a first fan mounted to the particulate fluid separation chamber and a second fan mounted to the oil settling compartment, wherein the plurality of fans are configured to remove hydrogen sulfide fumes and other toxic fumes during separation of the oil, the water, and the particulate matter.

11. The transportable separator of claim 1, further comprising a fire suppression system with a nitrogen unit mounted to the portable separation system, wherein the fire suppression system is located remote to the wellbore and mounted to at least one of: the particulate fluid separation chamber, the skim chamber, the water leg compartment, and the oil settling compartment.

12. The transportable separator of claim 1, further comprising a condensate tank connected inline between a gas flare system and the hydrodynamic jetted gas separator, wherein the condensate tank is maintained separate from the portable separation system and is configured to collect and drain condensate from the gas vapor from the hydrodynamic jetted gas separator prior to ignition by the gas flare system.

13. The transportable separator of claim 1 comprising a sweep pump connected to the power source and fluidly connected to the particulate fluid separation chamber to flow sweep material from the particulate fluid separation chamber to a sweep material tank.

14. A portable separation system comprising:
 a. a particulate fluid separation chamber for receiving vapor reduced fluid and particulate having particulate with a diameter ranging from 5 microns to ¾ of an inch and a mixture from a wellbore, wherein the particulate fluid separation chamber is configured for separating particulate free fluid from particulate matter;
 b. a variable speed screw conveyor for conveying the particulate matter to a container from the particulate fluid separation chamber and simultaneously allowing a mixture of water and oil to flow back into the particulate fluid separation chamber;
 c. a skim chamber with a skim chamber pump, the skim chamber configured for receiving the particulate free fluid, removing oil from the particulate free fluid, and forming oil free and particulate free fluid, wherein the skim chamber comprising a fluid level gauge in the skim chamber for controlling a level of the particulate free fluid in the skim chamber and flowing the oil free and particulate free fluid from the skim chamber;
 d. a water leg compartment receiving the oil free and particulate free fluid, the water leg compartment comprising an adjustable water leg;
 e. an oil settling compartment for receiving the oil from the skim chamber and forming cleaned oil, the oil settling compartment further comprising an oil settling compartment submersible pump to recycle basic sediment and water using a basic sediment and water conduit from the oil settling compartment to the skim chamber;
 f. an oil pump for transferring the cleaned oil to an oil containment device;
 g. a water leg pump connected to the water leg compartment for pumping a portion of the oil free and particulate free fluid to a containment area; and
 h. a power source in communication with the water leg pump, the oil pump, the skim chamber pump, the variable speed screw conveyor, the oil settling compartment submersible pump, and the fluid level gauge.

15. The portable separation system of claim 14, wherein the particulate fluid separation chamber comprising:
 a. a fluid guide for receiving the vapor reduced fluid and particulate from a hydrodynamic jetted gas separator;
 b. a perforated plate for receiving the vapor reduced fluid and particulate from the fluid guide and flowing the particulate to the variable speed screw conveyor; and
 c. a fluid separation box mounted to the particulate fluid separation chamber for converting the vapor reduced fluid and particulate to the particulate free fluid and conveying the particulate free fluid into the skim chamber.

16. The portable separation system of claim 14, further comprising a solids flow meter connected to the variable speed screw conveyor, the solids flow meter in electronic communication with a processor with a display, which are mounted apart from the portable separation system, wherein the processor is configured to measure an amount of particulate matter flowing from the variable speed screw conveyor and is electrically connected to the power source.

17. The portable separation system of claim 14, further comprising a pair of rotating adjustable skim tubes mounted transversely across the skim chamber for skimming oil from the particulate free fluid in the skim chamber and flowing the oil to a trough mounted to the skim chamber.

18. The portable separation system of claim 14, comprising a plurality of lights mounted to the portable separation system, wherein the plurality of lights are electrically connected to the power source.

19. The portable separation system of claim 14, comprising an oil level control in the oil settling compartment for monitoring and controlling the oil entering from the skim chamber.

20. The transportable separator of claim 1, comprising a flighting with slots for the variable speed screw conveyor, wherein the slots enable draining of the mixture of water and oil from the particulate matter as the variable speed screw conveyor moves the vapor reduced fluid and particulate from the particulate fluid separation chamber.

\* \* \* \* \*